United States Patent
Keithley

(10) Patent No.: US 8,976,417 B2
(45) Date of Patent: Mar. 10, 2015

(54) DITHER-SYNCHRONIZED IMAGE SCANNING

(75) Inventor: Douglas G. Keithley, Boise, ID (US)

(73) Assignee: Marvell World Trade Ltd., St. Michael (BB)

( * ) Notice: Subject to any disclaimer, the term of this patent is extended or adjusted under 35 U.S.C. 154(b) by 398 days.

(21) Appl. No.: 13/274,151

(22) Filed: Oct. 14, 2011

(65) Prior Publication Data

US 2012/0099159 A1    Apr. 26, 2012

Related U.S. Application Data

(60) Provisional application No. 61/406,922, filed on Oct. 26, 2010.

(51) Int. Cl.
| | | |
|---|---|---|
| G06F 3/12 | (2006.01) | |
| H04N 1/00 | (2006.01) | |
| H04N 1/047 | (2006.01) | |
| H04N 5/357 | (2011.01) | |

(52) U.S. Cl.
CPC ........... *H04N 1/00994* (2013.01); *H04N 1/047* (2013.01); *H04N 5/3577* (2013.01); *H04N 2201/0081* (2013.01); *H04N 2201/04755* (2013.01); *H04N 2201/04768* (2013.01)
USPC ............................ 358/3.13; 358/1.5; 358/409

(58) Field of Classification Search
USPC .................. 358/1.1, 1.5, 1.9, 3.13, 3.16, 409; 356/475
See application file for complete search history.

(56) References Cited

U.S. PATENT DOCUMENTS

| | | | | |
|---|---|---|---|---|
| 4,757,389 | A * | 7/1988 | Clark et al. .................... | 358/406 |
| 5,193,013 | A * | 3/1993 | Swanberg ...................... | 358/481 |
| 6,665,019 | B1 | 12/2003 | Pronkine | |
| 2006/0238225 | A1* | 10/2006 | Keithley et al. ............... | 327/113 |
| 2007/0120989 | A1 | 5/2007 | Minami et al. | |
| 2009/0086045 | A1* | 4/2009 | Giebel et al. ................ | 348/222.1 |
| 2009/0213261 | A1* | 8/2009 | Nagase et al. ................ | 348/312 |
| 2010/0193588 | A1* | 8/2010 | Cherry ........................... | 235/454 |

FOREIGN PATENT DOCUMENTS

| | | |
|---|---|---|
| EP | 2088766 | 8/2009 |
| EP | 2150041 | 2/2010 |
| JP | 2001077989 A | 3/2001 |
| JP | 2001268355 | 9/2001 |
| JP | 2003008845 A | 1/2003 |

* cited by examiner

*Primary Examiner* — Jamares Q Washington

(57) ABSTRACT

An optical scanning device performs sequential scanning passes. Individual pixels are scanned in response to a clock whose frequency is dithered in repeatable cycles to reduce electro-magnetic interference, and scanning passes are coordinated with the repeatable cycles.

16 Claims, 7 Drawing Sheets

DITHER-SYNCHRONIZED IMAGE SCANNING

TECHNICAL FIELD

This disclosure relates to image scanning devices, and more particularly to techniques for reducing electromagnetic interference generated by image scanning devices.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Optical image scanners typically transfer scanned image data from scanning hardware to some type of device controller. Because of design and packaging constraints, the device controller may be located at a significant distance from the scanning hardware. This creates the potential to generate unacceptable amounts of electromechanical interference (EMI, also referred to as radio-frequency interference or RFI).

Various techniques can be used to limit or mitigate EMI emissions, including bypassing, decoupling, shielding, and clock dithering. When using clock dithering, which may also be referred to as PLL dithering, a communications clock and corresponding data transfer rate are modulated by a small amount, such as 0.5-5% of the nominal data transfer rate, with 3% being typical. This spreads emitted EMI through a range of frequencies, and results in a reduction or mitigation of measured EMI.

Clock dithering can typically be implemented without significant hardware costs such as might be involved with electrical and mechanical techniques. However, clock dithering can reduce the accuracy and resolution of image scanning. This is particularly true as designers attempt to achieve ever higher levels of scanner speed and performance.

Many image scanners use a scanning mechanism in which a sensor or sensor array is sequentially moved or passed over adjacent lines of a source image. As the sensor moves across the source image, the sensor transmits a serial sequence of scanned color and/or brightness values. The values are sampled and transmitted at a relatively high frequency. However, at higher resolutions, sensors may be sensitive to variable scanning frequencies. For example, some sensors may have outputs that decay or settle with time, and some designs may sample such outputs before the outputs have completely settled. Thus, even small dithering of scanning and data transfer rates can produce inconsistencies, anomalies, and artifacts in scanned image data.

Because of this, it is important to sample the outputs of image sensors at consistent rates. Clock dithering, however, causes variable timing, which in turn causes inconsistent sensor readings.

SUMMARY

The present invention dithers the pixel scanning frequency in an optical scanner to reduce electro-magnetic interference. The scanning frequency is dithered in repeatable dithering cycles, and scanning cycles are synchronized to the dithering cycles.

In one aspect of the present invention, a method is provided for reducing electromagnetic emissions in an image scanner. In the method, pixel scanning is dithered in repeatable dithering cycles. Scanning passes are then coordinated with the dithering cycles.

In another aspect of the present invention, an optical scanner is provided for scanning source images. The scanner has control logic and a sensor that is responsive to the control logic to perform sequential pixel scanning passes. A communications bus conveys a clock signal between the control logic and the sensor. The clock signal has a frequency that is dithered in repeated dithering cycles. The scan control logic is configured to coordinate the pixel scanning passes with the repeated dithering cycles.

In yet another embodiment of the present invention, an apparatus is provided having a clock generator that generates a clock signal at a frequency that is dithered in repeated dithering cycles. A scanning unit is responsive to the clock signal to scan pixels in repeated pixel scanning passes. Scan control logic is configured to coordinate the pixel scanning passes with the repeated dithering cycles. Calibration logic is configured to perform one or more calibration passes in coordination with the dithering cycles.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION OF EMBODIMENTS OF THE DISCLOSURE

Figure 1:
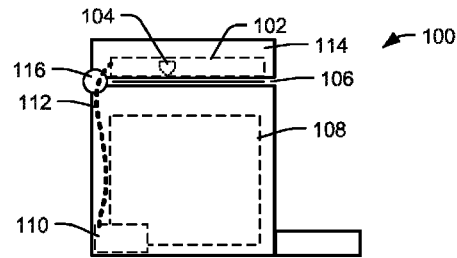
FIG. 1 is a simplified representation of an image scanning device that also includes printing capabilities.

FIG. 1 illustrates an image scanner or optical scanning device 100 in accordance with various embodiments of the present disclosure. The image scanner 100 may be integrated with a printer mechanism and/or other components to form what has become known as a multi-function printer or MFP. In other embodiments, a scanning device may comprise a stand-alone scanner. Furthermore, certain embodiments may comprise components or sub-components of an image scanner.

In the configuration illustrated by FIG. 1, the device 100 has a scanning unit, block, component, or sub-system 102 that performs image scanning functions. The scanning unit 102 has one or more optical sensors, sensor assemblies, or other scanning elements 104, which may comprise charge-coupled devices (CCDs) or other types of optical sensing devices.

In the illustrated embodiment, a source medium 106, such as a sheet of paper, contains the source image. The source medium 106 may be positioned above, below, or otherwise adjacent the scanning elements 104. The scanning elements 104 are configured to perform sequential scanning or sensing passes over the source image. For example, the scanning unit 102 may have a transport mechanism (not shown) configured to move or pass the scanning elements 104 across a horizontal line of the source medium 106 so that the scanning elements or sensors 104 can sample individual locations or pixels along the line. In addition, either the source medium 106 or the transport mechanism of the scanning unit 102 may be moved so that each pass of the scanning elements is of a different line of the source image.

Thus, the scanning unit 102 performs scanning passes of sequential image lines, each line of which comprises multiple pixels. Within each line, data is output from the scanning unit 102 as a series or sequence of pixel values. The sequence of pixel values may correspond to physical movement of the scanning elements 104 across the source medium 106, or may correspond to serial output characteristics of the scanning elements 104.

As noted above, image scanning devices may have integrated functionality in addition to scanning functionality. The image scanner 100 is illustrated in FIG. 1 as incorporating a printer component 108. The printer component 108 may share certain aspects of its operation with the scanning unit 102. For example, the printer component 108 may have paper handling capabilities and mechanisms that are shared with the scanning unit 102 and the paper handling mechanisms may be used to automatically feed document sheets through or past the scanning unit 102.

The scanning device of FIG. 1 has a device controller 110 that is configured to control the operation of the scanning unit 102 and any other integrated functionality such as the printer component 108. The device controller 110 is also configured to receive scanning data from the scanning unit 102 and its scanning elements 104. The device controller 110 may also perform other functions, such as communicating with external devices and interacting with users.

Because of design and packaging constraints, and the integration of multiple components within a single device, the device controller 110 may be at some distance from the scanning unit 102. In the embodiment of FIG. 1, for example, the device controller 110 is positioned at the bottom of the image scanner 100, and a communications bus or cable 112 extends within the image scanner 100 between the device controller 110 and the scanning unit 102. The cable 112 carries or conveys multiple signals, including data and control signals. These signals may include scanned data signals, clock signals, synchronization signals, and so forth. For example, the cable 112 may convey scanned pixel data from the scanning elements 104 to the device controller 110, in synchronization with a clock signal. In accordance with the techniques described herein, the clock signal may be dithered to mitigate electromagnetic emission issues.

The cable 112 may be relatively long, because of the physical distance between the device controller 110 and the scanning unit 102. Additionally, physical complexities and details of the image scanner 100 may in some cases necessitate complex routing of the cable 112, which may require further increases to a length of the cable 112. In the illustrated embodiment, for example, the image scanner 100 has a hinged upper component 114, and the cable 112 is routed through a hinge mechanism 116.

Different devices may of course be implemented in different ways, and may have different physical configurations. The device shown in FIG. 1 is merely an example of one possible implementation, serving to illustrate the constraints that can be raised by integration of multiple functions and capabilities in a single device.

Figure 2:
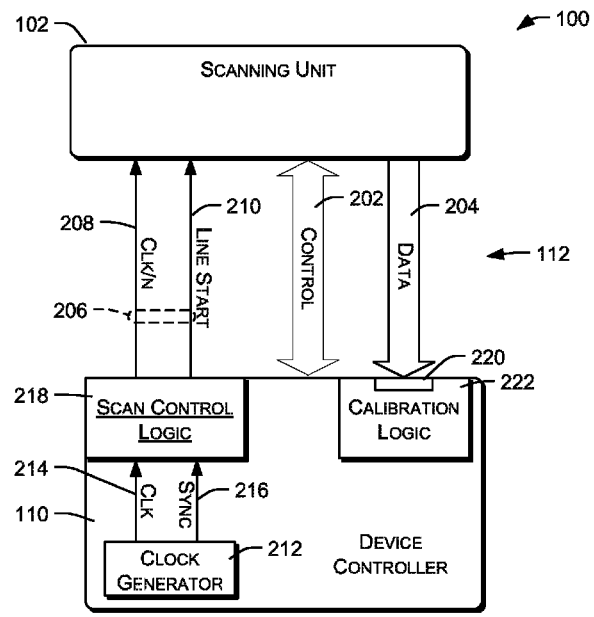
FIG. 2 is a block diagram showing relevant elements of the image scanning device of FIG. 1.

FIG. 2 illustrates further details regarding the scanning unit 102 and the device controller 110. Communications between the device controller 110 and the scanning unit 102 take place through the communications bus or cable 112, which in the illustrated example includes a control bus 202 and a data bus 204. The communications cable 112 may also include various timing and synchronization signals 206. In the described embodiment, the timing and synchronization signals 206 include a derivative clock signal 208 and a line start signal 210, which will be referred to herein as the CLK/n signal and the LINE START signal, respectively. Note that the CLK/n and LINE START signals may be considered part of the control bus 202, although the CLK/n and LINE START signals are shown separately in FIG. 2 for purposes of explanation.

The scanning unit 102 receives the CLK/n signal and the LINE START signal. The scanning unit 102 is responsive to the CLK/n and LINE START signals, as well as to other commands that may be presented through the control bus 202, to initiate individual sensing or scanning passes.

The device controller 110 has a clock generation module or section 212 that generates additional synchronization signals, including a CLK signal 214 and a SYNC signal 216. The device controller 110 also has scan control logic 218 that receives the CLK and SYNC signals and that generates the CLK/n and LINE START signals based on the CLK and SYNC signals. The characteristics and timing of the CLK, SYNC, CLK/n, and LINE START signals will be described in further detail below.

The device controller 110 has a pixel data receive port 220 configured to receive serial pixel data transmitted by the scanning unit 102 over the data bus 204. The serial pixel data may be in analog or digital format. An analog-to-digital converter (not shown) may be used within the device controller 110 or the scanning unit 102 to convert analog pixel data to digital pixel data.

The device controller 110 also has calibration logic 222 that is configured to correct pixel data received from the scanning unit 102. The calibration logic 222 has access to correction data that is applied to received pixel values. The correction data can be obtained during a previous calibration procedure, in which a known calibration image is scanned and evaluated. The calibration image has lines or areas of constant color and/or brightness, so that the consistency of the scanning unit 102 may be evaluated at different physical locations relative to the source media. Sensed inconsistencies in different physical locations are noted, and correction values are calculated corresponding to different pixel locations. During subsequent scanning of source media, the correction values are applied to received pixel values based on the locations to which the pixel values correspond.

Inconsistencies in pixel data can result from a variety of factors, such as variations in illumination, sensor positioning, and so forth. The calibration logic 222 assumes that such inconsistencies are functions of position, and that such positional inconsistencies will remain relatively constant over time. Thus, the correction data may include correction values for each pixel position of a line, and each received line may be subject to the same correctional data. Alternatively, the correction data may have values corresponding to the respective pixel positions of an entire scanned sheet or two-dimensional scanned area.

Figure 3:
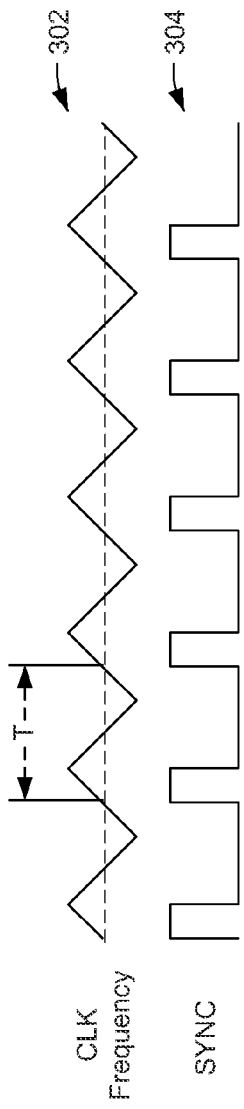
FIG. 3 is a timing diagram illustrating a method of clock dithering.
Figure 4:
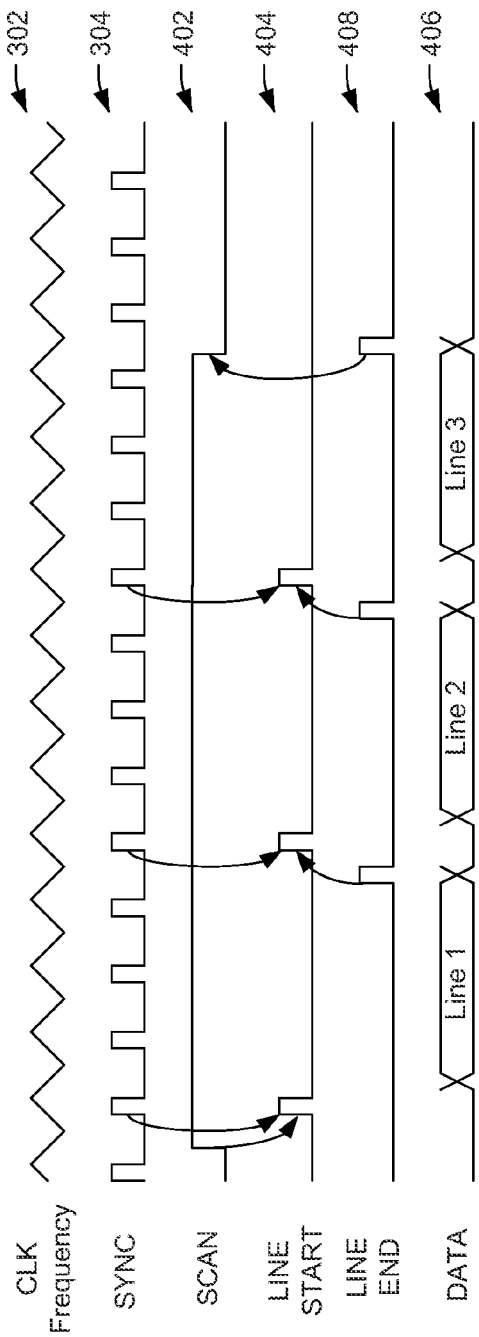
FIG. 4 is a timing diagram illustrating a method of synchronized image scanning in conjunction with clock dithering of FIG. 3.
Figure 5:
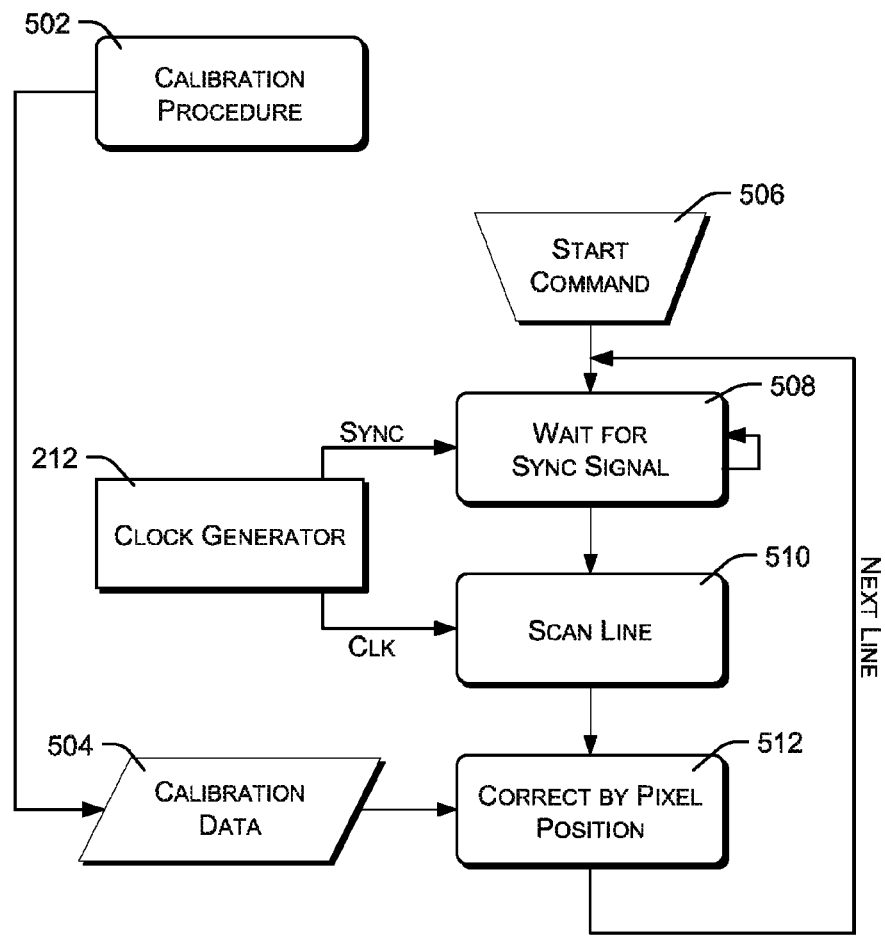
FIG. 5 is a flow diagram further illustrating the method described with reference to FIG. 4.

FIGS. 3-5 illustrate a method of dither-coordinated scanning that may be used to reduce EMI in an optical image scanner. Generally, the method comprises (a) dithering the frequency of pixel scanning in repeated dithering cycles, and (b) coordinating scanning passes with the dithering cycles or delaying individual scanning passes to coincide with dither cycles. This may include providing or generating a synchronization signal (such as the SYNC signal or the LINE START signal) that is timed to the repeated dithering cycles. In addition, the scanning unit 102 may be configured to start individual scanning passes at least partially in response to the synchronization signal.

FIG. 3 illustrates aspects of CLK dithering and SYNC signal timing. The CLK signal (not shown in FIG. 3) is an oscillating signal having a nominal frequency that is dithered by some predefined amount such as by ±0.5-5% of the nominal frequency, with 3% being a typical dithering amount. The upper trace 302 of FIG. 3 represents the frequency of the CLK signal over time. The dashed line along the center of the upper trace indicates the nominal frequency of the CLK signal.

In this example, the CLK frequency is dithered linearly around the nominal frequency, and this characteristic is represented by the triangle wave shown in FIG. 3. The dithering repeats in cycles of length or period T. Each such period or frequency cycle will be referred to herein as a dithering cycle. In the described embodiment, the period T of the dithering cycle is constant, although relatively slow frequency drift over time may not have a significant impact. Note that other frequency modulation shapes or techniques may also be used, although each dithering cycle should ideally have the same frequency modulation pattern or shape. Specifically, the dither amplitude, period, and spread mode (e.g. center, down) frequency modulation may be different than shown here.

The lower trace 304 of FIG. 3 represents the SYNC signal 216 that is generated by the clock generator 212 and that is timed to the repeated dithering cycles. The SYNC signal indicates the beginning of each dithering cycle. In this example, each leading edge of the SYNC signal coincides with the start of a corresponding dithering cycle. Note that the "start" of the dithering cycle can be arbitrarily defined relative to the dithering cycle, as long as (a) the period of the SYNC signal is the same as the dithering cycle period or an integer multiple of the dithering cycle period, and (b) the timing between the SYNC signal and the dithering cycle is the same from cycle to cycle.

The dither frequency is typically 30-100 KHz, but is not limited to this range. Generally, the dither period T should be less than or equal to the time required for a single scanning pass. Typically, the dither period T is shorter than the scanning pass, and multiple dithering cycles may occur during every scanning pass.

FIG. 4 illustrates further timing relationships relative to the clock dithering and SYNC signal described above. Again, although the CLK signal is not explicitly shown in FIG. 4, the CLK signal is assumed to be an oscillating signal whose frequency is as indicated by the illustrated CLK frequency signal 302. Note also that sensed pixel data is clocked or sampled in synchronization with the CLK signal, and the CLK signal (or its derivative CLK/n) may also be used in certain embodiments to trigger the scanning unit 102 to sample its optical sensor outputs or to initiate a pixel scan operation.

In the embodiment illustrated by FIG. 2, the clock signal CLK indicates the initiation of a pixel sampling cycle, which may include resetting the scan unit optical sensing circuitry and components, waiting for sensing signals to settle, triggering output sampling, and outputting sampled values on the data bus 208. The CLK/n signal is a sub-multiple of the CLK signal, and is therefore at a lower frequency than the CLK signal. The CLK signal may be reproduced within the scanning unit 102 through the use of a phase-locked loop that is synchronized with the CLK/n signal. The scanning unit 102 may be responsive to the CLK/n signal and/or to the CLK signal to coordinate movement and placement of sensing components relative to the source image. Thus, in an embodiment, the CLK signal dictates the frequency at which individual pixels are scanned.

A SCAN signal 402 indicates that a scanning operation has been commanded and/or is to begin. A scanning operation may comprise a scanning pass of a single line, or multiple scanning passes of multiple lines.

In response to the SCAN signal, the scan control logic 218 initiates a line scan or scanning pass. The LINE START signal 404 of FIG. 4 indicates the timing of the start of the scanning pass. As illustrated, each scanning pass is delayed until the beginning of a clock dithering cycle. More specifically, each scanning pass is delayed so that the given scanning pass coincides or is coordinated with the next SYNC signal and the corresponding clock dithering cycle. Accordingly, each scanning pass begins at the same point within a dithering cycle, and each scanning pass is thus performed under a consistent and repeatable clock frequency pattern.

The DATA signal 406 of FIG. 4 indicates the results of each line scan operation. In response to each LINE START signal, a single line of pixels is scanned in synchronization with the dithered CLK signal. FIG. 4 indicates three lines of scanned pixels: Line 1, Line 2, and Line 3; although a fewer or greater number of lines may be scanned in a given operation.

Scanning continues while the SCAN signal is active. A line scan or scanning pass begins at the LINE START signal, and a LINE END 408 signal indicates the end of the scanning pass. Assuming that the SCAN signal remains active, another line scan begins after each LINE END signal, delayed as before to coincide with the next SYNC signal. The LINE END signal may be used in this situation to trigger the next scanning pass. Alternatively, each scanning pass may consume a known time, corresponding to a known number of SYNC signals, and new scanning passes may be initiated repeatedly after the known number of SYNC signals has occurred.

FIG. 5 further illustrates the operation of the image scanner 100. An action 502 comprises a calibration procedure. The calibration procedure may be performed upon manufacture, distribution, installation, setup, or first use of the image scanner, or periodically to account for varying conditions and/or characteristics of the image scanner, its components, and/or its environment.

The calibration procedure 502 comprises one or more calibration scanning passes that are coordinated with the dithering cycles as described above, and which are evaluated to obtain pixel correction data. One type of calibration involves scanning a calibration image having a known color and intensity, or having different portions or lines of different known colors and intensities. Variations or inaccuracies in scanned values are analyzed and correction values are calculated so that corrected values are consistent with the known properties of the calibration image. The correction values are stored as calibration data 504. Note that during the calibration procedure, individual scanning passes are synchronized with the SYNC signal as shown in FIG. 4. Thus, the calibration procedure is performed under the same conditions as subsequent scanning operations.

The conditions that cause positional inconsistencies, including clock dithering, are assumed to be repeatable from one scan operation to the next. Accordingly, the calibration procedure 502 does not need to be performed prior to every scanning operation.

Note that varying clock frequency, such as introduced by clock frequency dithering, is one factor that may contribute to variations and inconsistencies in sensor readings. However, because each line scan is synchronized with the beginning of a dithering cycle, each line scan encounters the same repeating pattern of clock frequencies for each scanned line. That is, any particular pixel position within a line scan will always be scanned at the same portion of the clock dithering cycle, and will therefore always be scanned with the same clock frequency and sampling period. Stated differently, because scanning passes are synchronized with the dither cycle, each pass—whether a normal scanning pass or a calibration scanning pass—is subject to the same pattern of clock frequencies. This allows the calibration procedure to account and correct for scanning inconsistencies that may otherwise be caused by variations in clock frequency due to dithering.

To initiate scanning, the device controller 110 generates a start command 506, which may be equivalent to or result in an asserted SCAN signal or command 402. The scan control logic responds to the SCAN signal 402 by performing an action 508 of waiting for the assertion of the dither synchronization signal SYNC.

Upon receiving the next SYNC signal, the action 510 comprises initiating a line scan or scanning pass, which is performed in synchronization with the CLK signal provided by the clock generator 212. Each clock cycle initiates or triggers a pixel reading, resulting in a pixel value being transmitted over the data bus 204 to the device controller 110. The calibration logic 222 of the device controller 110 then performs an action 512 of correcting the received pixel values based on the calibration data 504, depending upon their positions in the scanned line or image or their sequence within the returned pixel values. The correcting comprises applying the correction data obtained in the previously performed calibration procedure 502 to the pixels of the completed scanning pass.

When the line has been scanned, assuming that scanning is to continue with another line, the process returns to the action 508, and waits for the next SYNC signal. Upon receiving the next SYNC signal, the actions 510 and 512 are repeated. Thus, each line scan is coordinated with the SYNC signal, and is performed under the same pattern of clock frequencies. This continues as long as the SCAN signal 402 is active or asserted.

Figure 6:
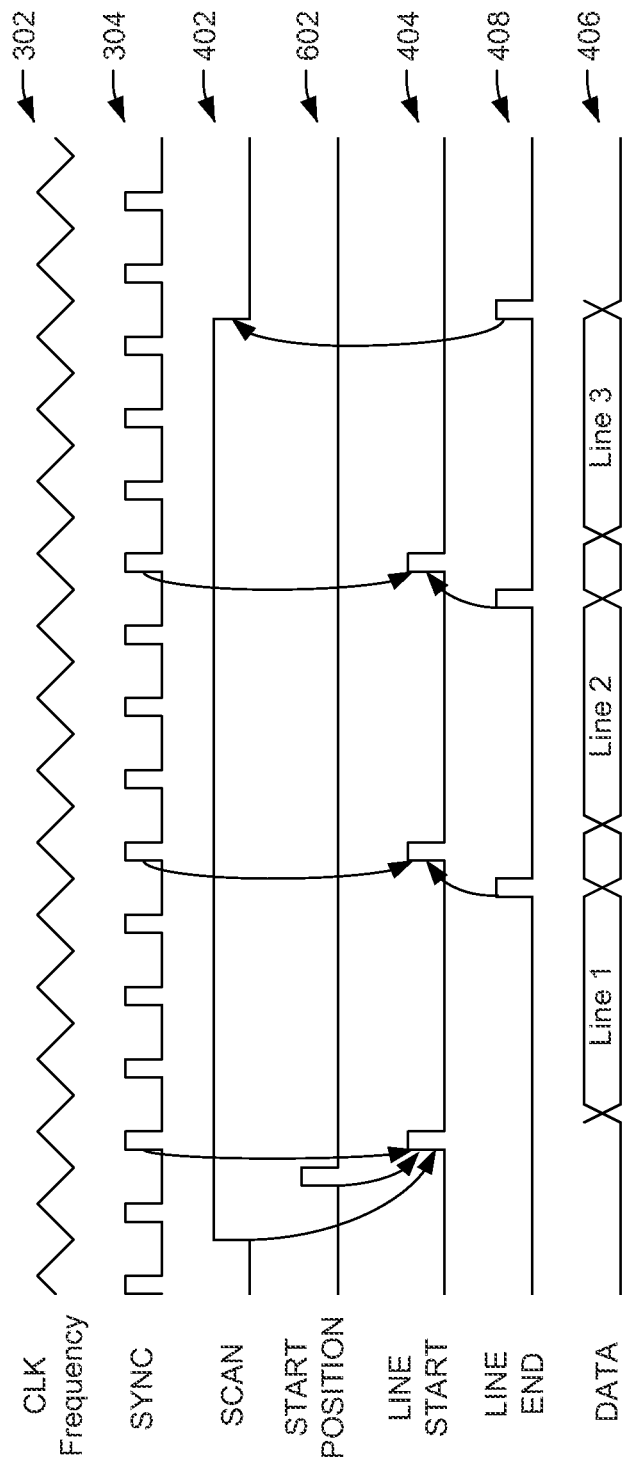
FIG. 6 is a timing diagram illustrating an additional method of synchronized image scanning in conjunction with the clock dithering of FIG. 3.

FIG. 6 illustrates operation in an embodiment in which scanning is to be additionally synchronized or coordinated to a START POSITION signal 602. Such a START POSITION signal may be a position signal generated by a motor controller circuit that determines the actual position of the scanning elements 104 based on an encoder or sensor related to the motor position. When the motor controller circuit has determined that a desired physical location has been reached, the START POSITION signal is asserted. If a scan is running (the SCAN signal is asserted), the device can now start scanning. Thus, in this embodiment, an initial line scan is delayed until assertion of the START POSITION signal. However, as in the case of FIG. 4, each subsequent line scan is also delayed to coincide with the SYNC signal.

More specifically, in this embodiment the initial LINE START signal is asserted only after the START POSITION signal is asserted, followed by the SYNC signal.

Figure 7:
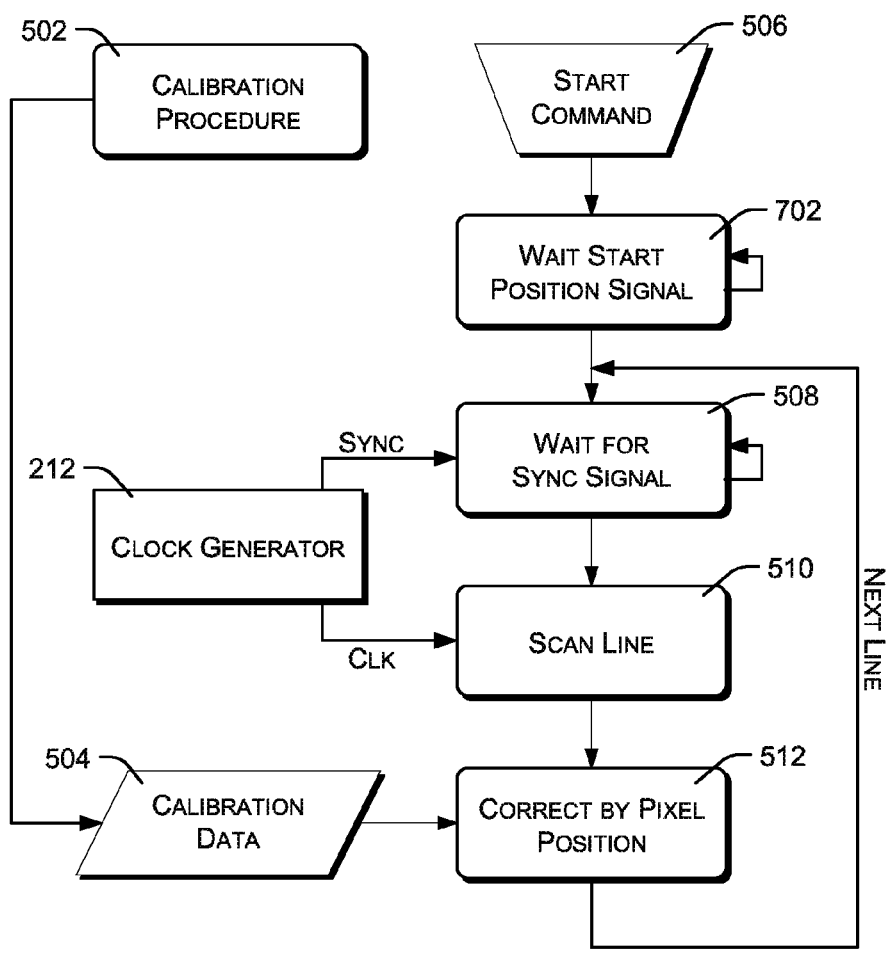
FIG. 7 is a flow diagram further illustrating the method described with reference to FIG. 6.

FIG. 7 illustrates operation of the image scanner 100 in accordance with the embodiment described with reference to FIG. 6. Actions illustrated in FIG. 7 are identical to those of FIG. 5, except that an action 702 has been added. The action 702 comprises waiting for the START POSITION signal to be asserted. This action is performed prior to scanning the first scan line. Subsequent lines are scanned without waiting for the START POSITION signal to be asserted.

Figure 8:
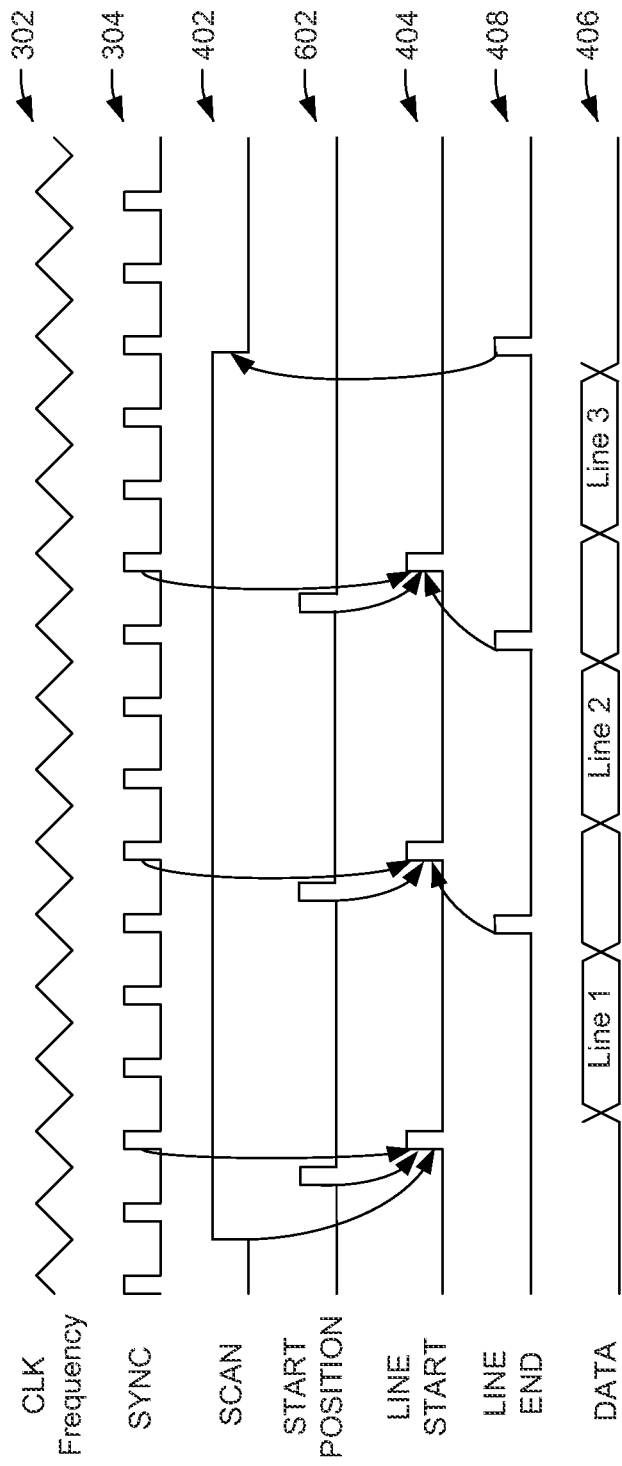
FIG. 8 is a timing diagram illustrating an additional method of synchronized image scanning in conjunction with the clock dithering of FIG. 3.

FIG. 8 illustrates operation in another embodiment, in which scanning of each line is to be synchronized or coordinated to the START POSITION signal 602. As in the example of FIG. 6, the START POSITION signal 602 may be position signal generated by a motor controller circuit that determines the actual position of the scanning elements 104 based on an encoder or sensor related to the motor position. When the motor controller circuit has determined that a desired physical location has been reached, the START POSITION signal is asserted, indicating that a new line may be scanned. Thus, in this embodiment, each line scan is delayed until assertion of the START POSITION signal.

In this embodiment, each instance of the LINE START signal, prior to every scan line, is asserted only after the START POSITION signal is newly asserted, followed by the SYNC signal.

Figure 9:
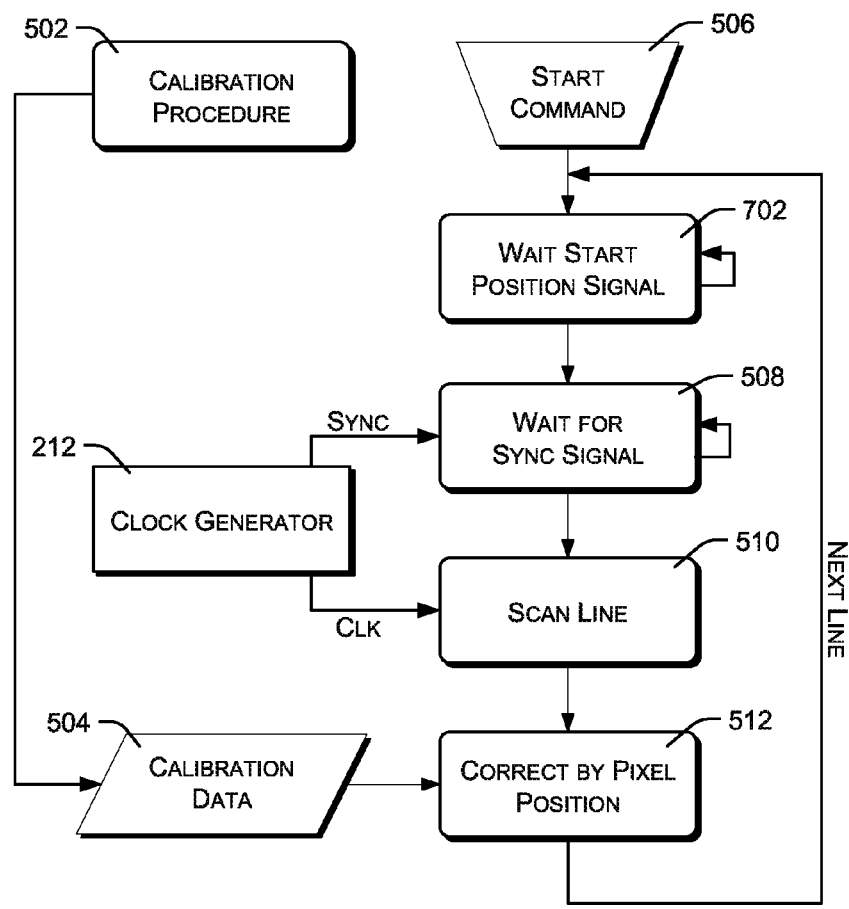
FIG. 9 is a flow diagram further illustrating the method described with reference to FIG. 8.

FIG. 9 illustrates operation of the image scanner 100 in accordance with the embodiment of FIG. 8. Actions illustrated in FIG. 9 are identical to those of FIG. 7, except that the action 702, which comprises waiting for the START POSITION signal to be asserted, is performed prior to every scan line rather than just prior to the initial line scan.

The techniques described above allow the use of clock frequency dithering to address EMI issues. Synchronizing scanning passes to repeatable dithering cycles furthermore allows scanning devices to compensate for any inconsistencies in sensor that that might otherwise result from clock dithering.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

This description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group)

and/or memory (shared, dedicated, or group) that execute one or more software or firmware programs, a combinational logic circuit, and/or other suitable components that provide the described functionality. The logic and functionality described herein may be implemented by any such components.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method of reducing electromagnetic emissions in an image scanner, the method comprising:
   in repeated dithering cycles, dithering a frequency of a clock signal that is used for pixel scanning, wherein the pixel scanning comprises scanning pixels of a source image during a scanning pass;
   coordinating initiation of scanning passes with the dithering cycles such that the beginning of each scanning pass occurs at a same point within a corresponding dithering cycle;
   performing one or more calibration passes to gather sensor correction data;
   coordinating the one or more calibration passes with the dithering cycles such that the beginning of each of the one or more calibration passes occurs at the same point within a corresponding dithering cycle; and
   based on the sensor correction data gathered during the one or more calibration passes, correcting pixel values generated during one or more scanning passes.

2. The method of claim 1, wherein the dithering cycles are shorter than the scanning passes.

3. The method of claim 1, wherein coordinating the initiation of scanning passes comprises generating a synchronization signal timed to the dithering cycles.

4. The method of claim 1, wherein coordinating the initiation of scanning passes comprises:
   generating a synchronization signal timed to the dithering cycles; and
   starting individual scanning passes in response to the synchronization signal.

5. The method of claim 1, wherein coordinating the initiation of scanning passes comprises delaying individual scanning passes to coincide with dithering cycles.

6. The method of claim 1, further comprising delaying one or more of the scanning passes based on a scanning position signal.

7. An optical scanner, comprising:
   scan control logic;
   a sensor that is responsive to the scan control logic to perform sequential pixel scanning passes;
   a communications bus that conveys a clock signal between the scan control logic and the sensor, wherein the clock signal has a frequency that is dithered in repeated dithering cycles; and
   calibration logic configured to (i) perform one or more calibration passes to gather sensor correction data, (ii) coordinate the one or more calibration passes with the dithering cycles such that the beginning of each of the one or more calibration passes occurs at a same point within a corresponding dithering cycle, and (iii) based on the sensor correction data gathered during the one or more calibration passes, correct pixel values generated during one or more scanning passes,
   wherein the scan control logic is configured to coordinate initiation of pixel scanning passes with the dithering cycles such that the beginning of each pixel scanning pass occurs at the same point within a corresponding dithering cycle.

8. The optical scanner of claim 7, wherein the scan control logic is further configured to delay one or more of the pixel scanning passes based on a scanning position signal.

9. The optical scanner of claim 7, wherein the dithering cycles are shorter than the pixel scanning passes.

10. The optical scanner of claim 7, wherein coordinating the pixel scanning passes comprises generating a synchronization signal timed to the dithering cycles.

11. The optical scanner of claim 7, wherein coordinating the pixel scanning passes comprises:
    generating a synchronization signal timed to the dithering cycles; and
    starting individual scanning passes in response to the synchronization signal.

12. The optical scanner of claim 7, wherein coordinating the pixel scanning passes comprises delaying individual scanning passes to coincide with dithering cycles.

13. An apparatus, comprising
    a clock generator that generates a clock signal at a frequency that is dithered in repeated dithering cycles;
    a scanning unit that is responsive to the clock signal to scan pixels in repeated pixel scanning passes such that a frequency of scanning pixels of a source image during the repeated scanning passes is dithered;
    scan control logic configured to coordinate initiation of pixel scanning passes with the dithering cycles such that the beginning of each pixel scanning pass occurs at a same point within the repeated dithering cycles; and
    calibration logic configured to (i) perform one or more calibration passes to gather sensor correction data, (ii) coordinate the one or more calibration passes with the dithering cycles such that the beginning of each of the one or more calibration passes occurs at the same point within a corresponding dithering cycle, and (iii) based on the sensor correction data gathered during the one or more calibration passes, correct pixel values generated during one or more scanning passes.

14. The apparatus of claim 13, wherein the scanning unit is further responsive to a synchronization signal that is timed to the dithering cycles.

15. The apparatus of claim 13, wherein the scan control logic delays individual pixel scanning passes to coordinate the individual pixel scanning passes with the dithering cycles.

16. The apparatus of claim 13, wherein the scan control logic delays individual pixel scanning passes to coordinate with a motor position signal.

* * * * *